(12) United States Patent
Le Hong et al.

(10) Patent No.: US 9,188,013 B2
(45) Date of Patent: Nov. 17, 2015

(54) TURBINE ENGINE TURBINE BLADE MADE OF A CERAMIC-MATRIX COMPOSITE WITH RECESSES MADE BY MACHINING

(75) Inventors: Son Le Hong, Thomery (FR); Jean-Luc Soupizon, Vaux le Penil (FR); Nicolas Christian Triconnet, Bruges (FR); Nicolas Eberling-Fux, Villenave D'Ornon (FR); Clement Roussille, Bordeaux (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 774 days.

(21) Appl. No.: 13/514,832

(22) PCT Filed: Dec. 8, 2010

(86) PCT No.: PCT/FR2010/052642
§ 371 (c)(1),
(2), (4) Date: Sep. 19, 2012

(87) PCT Pub. No.: WO2011/070294
PCT Pub. Date: Jun. 16, 2011

(65) Prior Publication Data
US 2013/0028746 A1     Jan. 31, 2013

(30) Foreign Application Priority Data

Dec. 9, 2009 (FR) .................................... 09 58798

(51) Int. Cl.
*F01D 5/30* (2006.01)
*F01D 5/28* (2006.01)
*C04B 35/80* (2006.01)

(52) U.S. Cl.
CPC ................ *F01D 5/282* (2013.01); *C04B 35/80* (2013.01); *F01D 5/284* (2013.01); *F01D 5/30* (2013.01);

(Continued)

(58) Field of Classification Search
CPC .................................. F01D 5/284; F01D 5/30
USPC ......... 156/89.11, 89.25, 89.28; 264/640–643, 264/682; 416/241 R, 241 A, 241 B, 230, 416/229 R
See application file for complete search history.

(56) References Cited

U.S. PATENT DOCUMENTS 5,350,545 A * 9/1994 Streckert et al. ........... 156/89.27
5,944,485 A   8/1999 Maumus et al.

(Continued)

FOREIGN PATENT DOCUMENTS

EP   1 555 391    7/2005
FR   2 616 779    12/1988

(Continued)

OTHER PUBLICATIONS

International Search Report Issued Mar. 7, 2011 in PCT/FR10/52642 Filed Dec. 8, 2010.

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A turbine engine turbine blade of ceramic matrix composite. The root of the blade includes a single densified fiber preform including at least one recess made by machining, each point of the root of the blade being situated at a distance from a free surface of the root that is no greater than twice the maximum penetration distance into the preform of densification gas for densifying the preform, and the distal portion of the root of the blade includes a distal wall that is continuous and in a single piece.

9 Claims, 3 Drawing Sheets

(52) U.S. Cl.
CPC ..... *C04B 2235/612* (2013.01); *C04B 2235/614* (2013.01); *C04B 2235/94* (2013.01); *F05D 2250/29* (2013.01); *F05D 2300/603* (2013.01); *Y10T 29/49234* (2015.01)

(56) References Cited

U.S. PATENT DOCUMENTS

| | | | |
|---|---|---|---|
| 6,837,952 | B1 | 1/2005 | Guirman et al. |
| 6,942,893 | B2 * | 9/2005 | Delperier et al. ............. 427/237 |
| 8,834,125 | B2 * | 9/2014 | Alvanos et al. ........... 416/220 R |
| 2005/0158171 | A1 * | 7/2005 | Carper et al. ................. 415/200 |
| 2007/0072007 | A1 | 3/2007 | Carper et al. |
| 2007/0148000 | A1 * | 6/2007 | Marusko et al. .......... 416/193 A |
| 2009/0110877 | A1 | 4/2009 | Bernard et al. |
| 2011/0027098 | A1 * | 2/2011 | Noe et al. .................. 416/241 B |
| 2013/0011271 | A1 * | 1/2013 | Shi et al. ....................... 416/230 |

FOREIGN PATENT DOCUMENTS

| | | |
|---|---|---|
| WO | 01 38625 | 5/2001 |
| WO | 2006 129040 | 12/2006 |

* cited by examiner

TURBINE ENGINE TURBINE BLADE MADE OF A CERAMIC-MATRIX COMPOSITE WITH RECESSES MADE BY MACHINING

The present invention relates to a turbine engine turbine blade made of ceramic-matrix composite (CMC).

A CMC is made from a fiber preform, and the preform is then densified by diffusing a gas in the preform. By means of the gas reacting with the fibers of the preform, a ceramic is produced that progressively fills in the gaps between the fibers of the preform. This ends up by obtaining a dense rigid CMC.

The way CMC parts are fabricated puts a maximum thickness limit on such a part. The thickness of the part cannot be greater than twice the maximum distance A that the reactive gas (densification gas) can penetrate into the fiber preform, given that the gas can diffuse into the inside of the part from each of two opposite faces.

The term "thickness" is used of a part (or of a portion of a part) to designate the smallest of its dimensions. For a blade 1, as shown diagrammatically in FIG. 4, the body 2 of the blade extends lengthwise (its longest dimension) from its tip 22 to its root 3 along a general longitudinal axis $A_G$. The width of the body 2 of the blade 1 or of its root 3 is the second largest dimension of the blade, measured from the trailing edge to the leading edge of the blade along a general transverse axis $B_G$ perpendicular to the general longitudinal axis $A_G$. For each portion of the blade, a local longitudinal axis A and a local transverse axis B are defined in similar manner that are contained in the plane P that is tangential to the free surface of said blade portion. The local axes A and B vary from one portion of the blade 1 to another because the blade 1 is twisted. The thickness of each blade portion is measured along the direction of the axis C that is perpendicular to the plane P and thus to the free surface of said portion. For the blade portion under consideration, its thickness is always its smallest dimension, as shown in FIG. 4.

Consideration is given solely to the blade portion surfaces that are parallel (or substantially parallel) to the general transverse axis $B_G$, i.e. it is considered that the local transverse axis B is parallel (or substantially parallel) to the general transverse axis $B_G$.

The above-mentioned limit on the thickness of a CMC part is not a problem for fabricating the body 2 of the blade 1, since the body 2 is of thickness that is small and always less than twice the maximum penetration distance Δ of the densification gas.

In contrast, the root 3 of the blade 1 presents a thickness that is greater, since it needs to be dovetail-shaped so as to be capable of being secured to the disk that carries the blades, as represented by dashed lines in FIG. 4, and so as to avoid becoming detached under the effect of the centrifugal force to which the blade is subjected in operation.

The root 3 of the blade therefore cannot be fabricated from a single preform.

In order to remedy that problem, one known solution consists in fabricating an insert 130 out of CMC (or some other similar material, e.g. sintered SiC) that is inserted into the central portion of a preform 30 for the root 3 of the blade, thereby subdividing the preform 30 into two branches 31 and 32. The insert 130 extends along the transverse axis B of the root of the blade 1. Each branch 31 and 32 of the preform 30 thus presents a minimum thickness that is less than twice the maximum penetration distance Δ of the densification gas. For each of the branches 31 and 32, this thickness is measured along the direction of the axis C for that branch, which direction is perpendicular to the free surface of the branch.

In practice, each branch 31 and 32 of the preform 30 must actually present a thickness that is less than the penetration distance Δ of the densification gas. The insert 130 must necessarily be placed between the branches 31 and 32 prior to densifying the preform 30, since after being densified the shapes of the branches 31 and 32 of the preform 30 are "frozen", and an insert, which is necessarily rigid, could no longer be placed between the branches, while also being in intimate contact with their surfaces. Thus, the preform 30 can be densified only with the insert 130 already in place in the gap between its branches 31 and 32, and consequently the densification gas can be injected only through the outside surface 315 of the branch 31 and the outside surface 325 of the branch 32. The outside surfaces 315 and 325 are the surfaces of the branches that are furthest away from the general plane $P_G$ of the blade 1 and of the root 3 (i.e. the plane defined by the general axes $A_G$ and $B_G$ of the blade).

Under certain circumstances, the insert 130 itself presents a maximum thickness that is greater than the maximum penetration distance Δ of the densification gas required for its own fabrication. The insert 130 must therefore itself include a second insert in its center in order to ensure that the thickness of each portion of the insert 130 is less than the maximum penetration Δ of the densification gas.

The limitation on the thickness of the branches of the preform 30 makes fabrication of the root 3 of the blade 1 more complex and more expensive. The blade root then comprises a plurality of elements (the preform 30 and the insert 130, and possibly a second insert) that need to be fabricated separately and then assembled together and densified. Furthermore, the fact that the root 3 of the blade 1 is not constituted by a single preform (a single element) but from two or more preforms reduces its structural integrity. Likewise, the presence of an insert restricts the possible shapes for the platform of the disk carrying the blade since, for reasons of structural integrity, the insert must not intersect the surface containing the plane of the platform (the platform is the portion of the disk that is situated at the interface between the root 3 and the body 2 of the blade 1 when the blade is assembled on the disk).

The present invention seeks to remedy those drawbacks.

The invention seeks to provide a blade in which the root can be fabricated from a single preform, and in which the structural integrity is sufficient to withstand the centrifugal force to which it is subjected in operation.

This object is achieved by the fact that the root of the blade comprises a single densified fiber preform including at least one recess made by machining, each point of said root of the blade being situated at a distance from a free surface of said root that is no greater than twice the maximum penetration distance into said preform of densification gas for densifying the preform, and the distal portion of said root of the blade has a continuous wall extending from one end to the other of the root of the blade in a direction that is substantially perpendicular to the general plane $P_G$ in which said blade mainly extends.

By means of these provisions, fabrication of the blade root is simplified and less expensive, while nevertheless conserving mechanical performance compared with a blade root having an insert. The platform of the disk carrying the blade may also have a shape that is designed more freely, since there is no longer an insert. Furthermore, a weight saving is achieved since the root of each blade includes less material.

The invention also provides a method of fabricating a turbine engine turbine blade out of ceramic matrix composite.

According to the invention, the method comprises the following steps:

a) preparing a fiber preform;

b) machining said preform in such a manner as to form at least one recess in said preform; and c) densifying said preform with a densification gas;

said at least one recess being made in such a manner that each point of said root of the blade is situated at a distance from a free surface of said root that is no greater than twice the maximum penetration distance into said preform of densification gas for densifying the preform, and the distal portion of said root of the blade including a distal wall that is continuous and in a single piece.

The invention can be well understood and its advantages appear better on reading the following detailed description of an embodiment given by way of non-limiting example. The description refers to the accompanying drawings, in which.

In the description below, the terms "inside" and "outside" indicate the region of the recess(es) inside the blade and the region outside the blade, respectively. The terms "top" and "bottom" indicate the regions directed towards the tip of the blade and towards the root of the blade, respectively.

Figure 1:
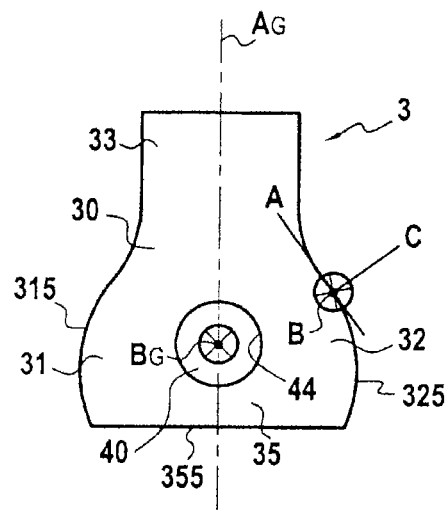
FIG. 1 is a face view of the root of a blade of the invention.

FIG. 1 shows the root 3 of a blade of the invention.

To make the root 3, a fiber preform 30 is made as a single piece (by weaving or by braiding) to have a shape that is substantially the final shape of the root 3. The preform 30 is thus dovetail-shaped with a tang 33 extending along the general longitudinal axis $A_G$ of the body 2 of the blade (drawn as a chain-dotted line) and that flares towards its end in the direction of the transverse axis $B_G$ that is perpendicular to the general longitudinal axis $A_G$ so as to form a dovetail-shape. The general transverse axis $B_G$ is perpendicular to the plane of FIG. 1.

Before densifying the preform 30, a recess is made in the dovetail of the preform 30. Specifically, this recess is made by piercing a through hole 40 in the preform 30 along the general transverse axis $B_G$. The preform 30 thus presents a section in a plane perpendicular to the transverse axis $B_G$ that is substantially constant, as shown in FIG. 1.

After piercing the hole 40, the preform 30 has a first branch 31 and a second branch 32 that are symmetrical about the hole 40 and the general plane $P_G$ (the plane defined by the general axes $A_G$ and $B_G$ of the blade). The first branch 31 and the second branch 32 join together on the side of the hole 40 that is opposite from the tang 33 so as to form a distal wall 35 that constitutes the (distal) bottom end of the preform 30.

In a plane perpendicular to the transverse axis $B_G$, the hole 40 is thus completely surrounded by the preform 30 and defined by a face 44 that is thus the inside face of the first branch 31, of the second branch 32, and of the distal wall 35.

Thus, the recess 40 does not open out into the distal wall 35 of the root 3 of the blade 1.

The distal wall 35 is made as a single piece, i.e. the outside face 355 of the distal wall 35 is a set that is connected in the topological sense.

The fact that the bottom end of the preform 30, i.e. the distal portion of the blade root 3, forms the distal wall 35 that extends from the first branch 31 to the second branch 32 in a direction that is substantially perpendicular to the general plane $P_G$ makes it possible for the blade root 3, once the preform 30 has been densified, to have sufficient rigidity and to prevent the first branch 31 and the second branch 32 from moving towards each other under the effect of the forces to which the blade 1 is subjected in operation.

After the hole 40 has been drilled, the preform 30 is densified by diffusing a reactive gas into the preform 30. The reactive gas is caused to diffuse from the outside face 315 of the first branch 31, from the outside face 325 of the second branch 32, and from the outside face 355 of the distal wall 35. In addition, because of the hole 40, it is possible to cause the reactive gas to diffuse from the inside faces 44 of these branches and of the distal wall 35, i.e. via the hole 40. Each of the two branches 31 and 32, and also the distal wall 35, can thus be of a thickness that is equal to twice the maximum penetration distance $\Delta$ of the reactive gas, since the reactive gas can penetrate via two opposite faces of the portions (first branch 31, second branch 32, distal wall 35).

For example, the maximum penetration distance $\Delta$ of the densification gas may lie in the range 2 millimeters (mm) to 4 mm.

In another embodiment of the invention, one or more recesses are formed that extend for the most part in a plane perpendicular to the general transverse axis $B_G$.

Figure 2A:
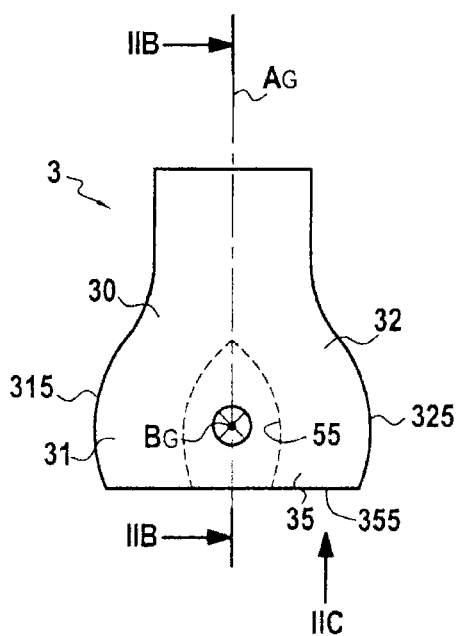
FIG. 2A is a face view of the root of a blade in another embodiment of the invention.
Figure 2B:
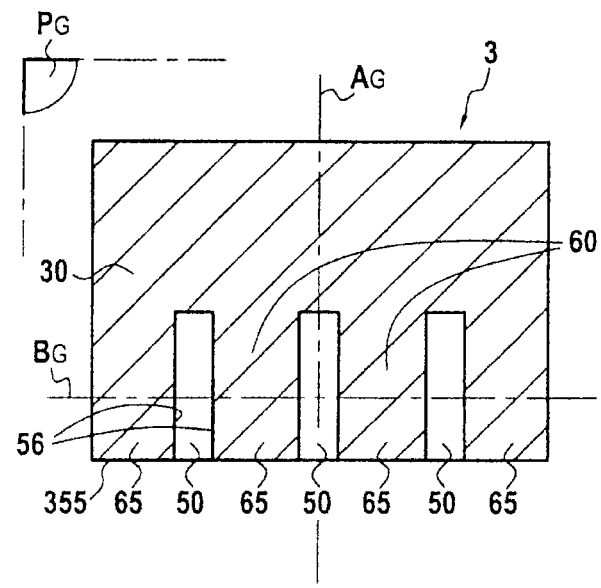
FIG. 2B is a section on plane BB through the blade root of FIG. 2A.

Specifically, as shown in FIGS. 2A and 2B, three recesses 50 are machined in the preform 30 from the outside face 355 of the distal wall 35, the recesses being centered on the general longitudinal axis $A_G$ and opening out only into the outside face 355. The general transverse axis $B_G$ is perpendicular to the plane of FIG. 2A.

FIG. 2B is a section through the middle of the FIG. 2A blade root, on the general plane $P_G$.

Each recess 50 is defined firstly by an inside face 55, half of which is parallel to the outside face 315 of the first branch 31 and the other half of which is parallel to the outside face 325 of the second branch 32, such that the thickness of the first branch 31 and the thickness of the second branch 32 in register with the recesses 50 is substantially constant. The term "in register with a recess" means "in a plane perpendicular to the general transverse axis $B_G$ and passing through the recess".

Each recess 50 is also defined by two mutually parallel side faces 56 that are perpendicular to the general transverse axis $B_G$.

The recesses are machined in such a manner that, in register with the recesses 50, both the first branch 31 and the second branch 32 are of a thickness that is equal to no more than twice the maximum penetration distance $\Delta$ of the reactive gas.

The three recesses 50 are spaced apart from one another along the general transverse axis $B_G$ by walls 60. The walls 60 are of a thickness (measured along the general transverse axis $B_G$) that is equal to no more than twice the maximum penetration distance $\Delta$ of the reactive gas.

Thus, given that the reactive gas can penetrate into the first branch 31 and into the second branch 32 both via the inside face 55, via the outside faces 315 and 325, and via the side faces 56, all of the points in the first branch 31 and the second branch 32 are reached by the reactive gas. Densification of the preform 30 is therefore complete.

The distal portion of the root 3 of the blade has a plurality of continuous walls extending from the first branch 31 to the second branch 32 in a direction that is substantially perpendicular to the general plane $P_G$, i.e. the distal portions 65 of the walls 60. These distal portions 65 of the walls 60 form the distal wall 35 of the root 3 of the blade and impart sufficient rigidity to the root 3 of the blade 1 once the preform 30 has been densified.

Once these recesses 50 have been machined, the preform is densified by causing a reactive gas to diffuse.

Figure 2C:
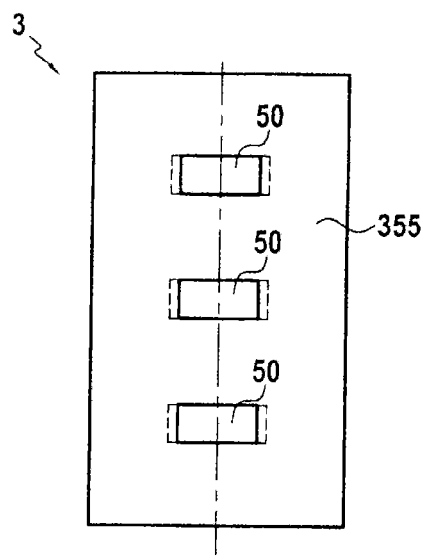
FIG. 2C is a view from beneath of the blade root of FIG. 2A.

FIG. 2C is a view from beneath of the root 3 of the blade 1, i.e. a view of the outside face 355 of the distal wall 35. The three recesses 50 open out into the outside face 355 of the distal wall 35.

The preform 30 may also present a recess 40 that is made by drilling along the general transverse axis $B_G$ (as shown in FIG. 1) plus one or more recesses 50 extending essentially perpendicularly to the general transverse axis $B_G$ (as shown in FIGS. 2A, 2B, and 2C).

The preform 30 may present one or more recesses other than those described above. In general, these recesses are distributed in such a manner that each point of the root 3 of the blade is situated at a distance from a free surface of the root that is no more than twice the maximum penetration distance Δ of the densification gas into said preform, such that all of the portions of the blade 1 are reached by the densification gas.

Figure 3A:
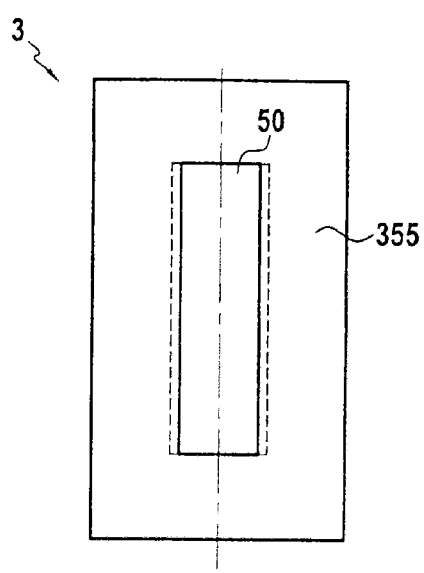
FIG. 3A is a view from beneath of a blade root in yet another embodiment of the invention.
Figure 3B:
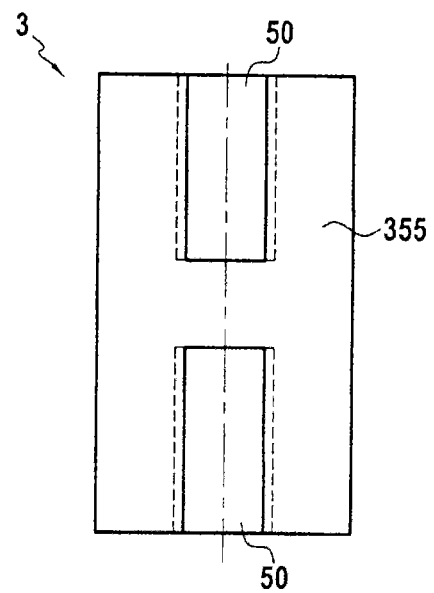
FIG. 3B is a view from beneath of the root of a blade in yet another embodiment of the invention.
Figure 4:
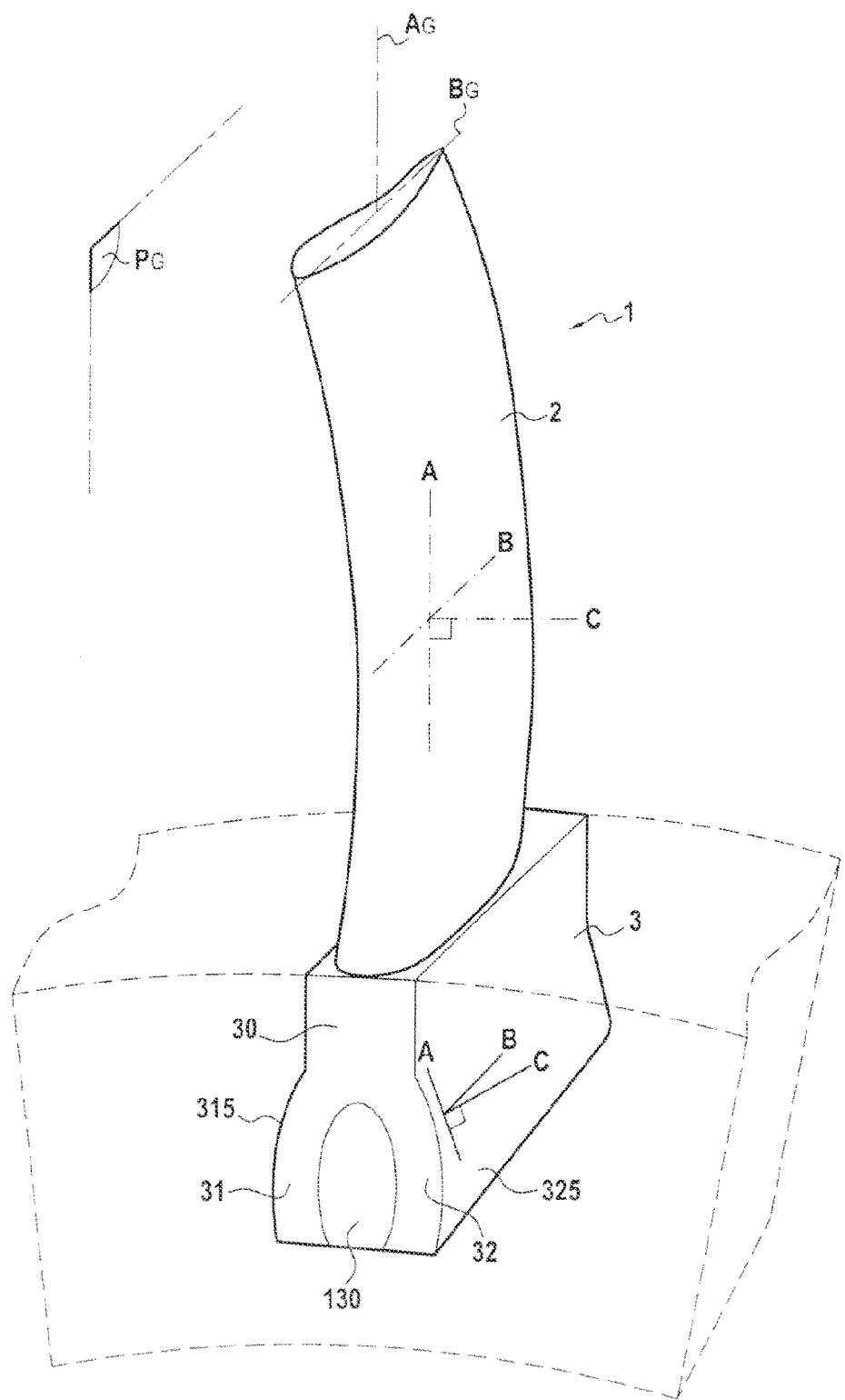
FIG. 4 is a perspective view of a prior art blade.

FIGS. 3A and 3B are respective views of the outside faces 355 of the distal walls 35 of the roots 3 of other blades 1 of the invention.

In FIG. 3A, the root 3 has a single central recess 50 that is completely surrounded by the outside face 355. The outside face 355 is thus rectangular in shape with the center of the rectangle being the recess 50.

In FIG. 3B, the root 3 has two recesses 50 such that the outside face 355 is substantially H-shaped, the top and bottom portions of the bars of the H-shape being formed by the two recesses 50.

In the embodiments of FIGS. 2A, 2B, 2C, 3A, and 3B, the recesses 50 open out into the outside face 355 of the distal wall 35.

In all embodiments of the invention, the distal wall 35 is a single piece, i.e. the outside face 355 of the distal wall 35 (in a plane substantially perpendicular to the general axis $A_G$) is a set that is connected in the topological sense (i.e. the outside face 355 is not made up of a plurality of portions, but comprises a single portion).

In all embodiments of the invention, the distal portion of the root 30 of the blade has a continuous distal wall 35 extending from one end of the root 3 of the blade to the other along a direction that is substantially perpendicular to the general plane $P_G$ in which the blade 1 mainly extends.

For example, the or each recess presents a shape such that in the direction of the general longitudinal plane $P_G$ it is narrower at its ends and wider in its middle portion, as applies to the recess 40 in FIG. 1 and the recesses 50 in FIGS. 2A, 2B, 2C, 3A, and 3B.

Thus, the recesses are situated essentially in the inside region of the root 3 of the blade 1. Compared with a prior art blade including an insert, the mechanical performance of a blade of the invention including one or more recesses 40, 50 is thus hardly affected by the presence of these recesses, since the inside region of the root 3 of the blade 1 is less stressed mechanically than is the outside region of the root 3 of the blade 1.

In all embodiments of the invention, fibers of the preform 30 are cut while making the recesses 40, 50. Nevertheless, this is not troublesome since the only portions of the fibers to be cut are portions remote from the outside faces 315 and 325. It is important for the outside faces to remain intact since they are in contact with the housings in the bladed disk, and therefore need to withstand forces in operation.

The invention claimed is:

1. A turbine engine turbine blade of ceramic matrix composite,
    wherein a root of the blade comprises a single densified fiber preform including first and second branches, a tang extending along a general longitudinal axis of the blade, and at least one recess,
    wherein the first branch and the second branch are symmetrical about a general plane defined by the general longitudinal axis and a general transverse axis of the blade,
    wherein each point of the root of the blade being situated at a distance from a free surface of the root that is no greater than twice the maximum penetration distance into the preform of densification gas for densifying the preform,
    wherein the first branch and the second branch join together on a side opposite the tang so as to form a distal wall that constitutes a distal portion of the root of the blade,
    wherein a face defining the recess is an inside face of at least one of the first branch, of the second branch, or of the distal wall, and
    wherein the distal wall is continuous and in a single piece.

2. A blade according to claim 1, wherein the maximum penetration distance of the densification gas lies in the range 2 mm to 4 mm.

3. A blade according to claim 1, wherein the at least one recess is of a shape such that, in a direction of a general longitudinal plane, it is narrower at its ends and wider in its middle portion.

4. A blade according to claim 1, wherein the at least one recess does not open out into an outside face of the distal wall of the root of the blade.

5. A blade according to claim 1, wherein the at least one recess opens out into an outside face of the distal wall of the root of the blade.

6. A method of fabricating a turbine engine turbine blade of ceramic matrix composite, the method comprising:
    a) preparing a fiber preform including first and second branches, and a tang extending along a general longitudinal axis of the blade, the first branch and the second branch being symmetrical about at least one recess and a general plane defined by the general longitudinal axis and a general transverse axis of the blade, and the first branch and the second branch joining together on a side opposite the tang so as to form a distal wall that constitutes a distal portion of the root of the blade;
    b) machining the preform so as to form at least one recess in the preform; and
    c) densifying the preform with a densification gas;
    the at least one recess being made such that each point of a root of the blade is situated at a distance from a free surface of the root that is no greater than twice the maximum penetration distance into the preform of densification gas for densifying the preform, a face defining the recess being an inside face of at least one of the first branch, of the second branch, or of the distal wall and the distal wall is continuous and in a single piece.

7. A method of fabricating a blade according to claim 6, wherein the at least one recess is of a shape such that, in a direction of a general longitudinal plane it is narrower at its ends and wider in its middle portion.

8. A method of fabricating a blade according to claim 6, wherein the at least one recess does not open out into an outside face of the distal wall of the root of the blade.

9. A method of fabricating a blade according to claim 6, wherein the at least one recess opens out into an outside face of the distal wall of the root of the blade.

* * * * *